US008037176B2

(12) United States Patent
Hopkins

(10) Patent No.: US 8,037,176 B2
(45) Date of Patent: *Oct. 11, 2011

(54) METHOD FOR MONITORING AND PROVIDING INFORMATION OVER A PEER TO PEER NETWORK

(75) Inventor: Samuel P. Hopkins, Freedom, PA (US)

(73) Assignee: Tiversa, Inc., Cranberry Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,146

(22) Filed: Aug. 4, 2010

(65) Prior Publication Data

US 2011/0029660 A1 Feb. 3, 2011

Related U.S. Application Data

(63) Continuation of application No. 11/599,180, filed on Nov. 14, 2006, now Pat. No. 7,783,749, which is a continuation of application No. 10/764,111, filed on Jan. 23, 2004, now Pat. No. 7,761,569.

(51) Int. Cl.
*G06F 15/16* (2006.01)
*G06F 15/173* (2006.01)

(52) U.S. Cl. ........ 709/224; 709/226; 709/228; 709/231; 709/232

(58) Field of Classification Search .................. 709/217, 709/219, 227, 232, 224, 226, 228, 231
See application file for complete search history.

(56) References Cited

U.S. PATENT DOCUMENTS

| 111,604 A | 2/1871 | Bailey |
| 5,233,604 A | 8/1993 | Ahmadi et al. |
| 5,600,638 A | 2/1997 | Bertin et al. |
| 5,794,254 A | 8/1998 | McClain |

(Continued)

FOREIGN PATENT DOCUMENTS

EP 1107512 A1 6/2001

(Continued)

OTHER PUBLICATIONS

Notification Concerning Transmittal of International Preliminary Report on Patentability and Written Opinion for PCT/US2008/007262, date of mailing: Feb. 11, 2010 (7 pages).

(Continued)

*Primary Examiner* — Quang N. Nguyen
(74) *Attorney, Agent, or Firm* — Hamilton, Brook, Smith & Reynolds, P.C.

(57) ABSTRACT

A pseudonode for deployment on a peer to peer network. The pseudonode is programmed for monitoring the peer to peer network to receive search requests therefrom, optionally comparing each said received search with said list of data objects, and to respond to such requests. The response may include advertising; the advertising may be selected in response to the request. The invention also provides a method for monitoring search requests for selected objects by nodes on a peer to peer network. The method further includes interposing the pseudonodes on the network in which it is configured to provide at least one IP address and optionally at least one client ID. The pseudonode has at least one stored object corresponding to a request object stored at said pseudonode; and monitors the network to detect requests matching at least one of the stored objects and acquires a unique ID generated by any network node requesting the object matching that stored object on the pseudonode, and responding to substantially each node representing an acquired ID.

4 Claims, 8 Drawing Sheets

U.S. PATENT DOCUMENTS

| | | | |
|---|---|---|---|
| 5,949,760 A | 9/1999 | Stevens et al. | |
| 5,987,011 A | 11/1999 | Toh | |
| 6,069,896 A | 5/2000 | Borgstahl et al. | |
| 6,076,088 A | 6/2000 | Paik et al. | |
| 6,147,971 A | 11/2000 | Rochberger et al. | |
| 6,205,146 B1 | 3/2001 | Rochberger et al. | |
| 6,397,246 B1* | 5/2002 | Wolfe | 709/217 |
| 6,483,808 B1 | 11/2002 | Rochberger et al. | |
| 6,668,289 B2 | 12/2003 | Cheng et al. | |
| 6,732,180 B1 | 5/2004 | Hale et al. | |
| 6,742,023 B1* | 5/2004 | Fanning et al. | 709/219 |
| 6,839,769 B2 | 1/2005 | Needham et al. | |
| 6,855,660 B2 | 2/2005 | Tsou et al. | |
| 6,918,113 B2 | 7/2005 | Patel et al. | |
| 6,965,591 B1 | 11/2005 | Roy | |
| 6,983,320 B1 | 1/2006 | Thomas et al. | |
| 7,003,514 B2 | 2/2006 | Dutta et al. | |
| 7,010,534 B2 | 3/2006 | Kraft | |
| 7,051,102 B2 | 5/2006 | Gupta et al. | |
| 7,089,301 B1 | 8/2006 | Labio et al. | |
| 7,120,145 B2 | 10/2006 | Ohba et al. | |
| 7,174,382 B2 | 2/2007 | Ramanathan et al. | |
| 7,177,295 B1 | 2/2007 | Sholander et al. | |
| 7,277,946 B2 | 10/2007 | Humphrey et al. | |
| 7,318,092 B2 | 1/2008 | Sutler | |
| 7,327,683 B2 | 2/2008 | Ogier et al. | |
| 7,493,363 B2 | 2/2009 | Huitema et al. | |
| 7,583,682 B2 | 9/2009 | Hopkins | |
| 7,600,033 B2* | 10/2009 | Bauer et al. | 709/232 |
| 7,761,569 B2 | 7/2010 | Hopkins | |
| 7,783,749 B2 | 8/2010 | Hopkins | |
| 2001/0003191 A1 | 6/2001 | Kovacs et al. | |
| 2002/0044549 A1 | 4/2002 | Johansson et al. | |
| 2002/0065832 A1 | 5/2002 | Mack | |
| 2002/0069098 A1 | 6/2002 | Schmidt | |
| 2002/0073204 A1 | 6/2002 | Dutta et al. | |
| 2002/0087885 A1 | 7/2002 | Peled et al. | |
| 2002/0138471 A1 | 9/2002 | Dutta et al. | |
| 2002/0143989 A1 | 10/2002 | Huitema et al. | |
| 2002/0152262 A1 | 10/2002 | Arkin et al. | |
| 2002/0161844 A1 | 10/2002 | Overtoom | |
| 2002/0181395 A1 | 12/2002 | Foster et al. | |
| 2002/0184310 A1 | 12/2002 | Traversat et al. | |
| 2003/0005035 A1 | 1/2003 | Rodgers | |
| 2003/0037167 A1 | 2/2003 | Garcia-Luna-Aceves et al. | |
| 2003/0050966 A1 | 3/2003 | Dutta et al. | |
| 2003/0050980 A1 | 3/2003 | Dutta et al. | |
| 2003/0055892 A1 | 3/2003 | Huitema et al. | |
| 2003/0078889 A1 | 4/2003 | Lee et al. | |
| 2003/0088544 A1 | 5/2003 | Kan et al. | |
| 2003/0095660 A1 | 5/2003 | Lee et al. | |
| 2003/0112823 A1 | 6/2003 | Collins et al. | |
| 2003/0182428 A1* | 9/2003 | Li et al. | 709/227 |
| 2003/0191828 A1 | 10/2003 | Ramanathan et al. | |
| 2003/0195852 A1 | 10/2003 | Campbell et al. | |
| 2003/0202468 A1 | 10/2003 | Cain et al. | |
| 2003/0208621 A1 | 11/2003 | Bowman | |
| 2003/0212710 A1 | 11/2003 | Guy | |
| 2004/0030651 A1 | 2/2004 | Kim et al. | |
| 2004/0039921 A1 | 2/2004 | Chuang | |
| 2004/0044790 A1 | 3/2004 | Loach et al. | |
| 2004/0044996 A1 | 3/2004 | Atallah | |
| 2004/0088347 A1 | 5/2004 | Yeager et al. | |
| 2004/0098370 A1 | 5/2004 | Garland et al. | |
| 2004/0111604 A1 | 6/2004 | Fournier | |
| 2004/0122958 A1 | 6/2004 | Wardrop | |
| 2004/0143842 A1 | 7/2004 | Joshi | |
| 2004/0148434 A1 | 7/2004 | Matsubara et al. | |
| 2004/0153658 A1 | 8/2004 | Gunyakti et al. | |
| 2004/0158630 A1 | 8/2004 | Chang et al. | |
| 2004/0162871 A1 | 8/2004 | Pabla et al. | |
| 2004/0196784 A1 | 10/2004 | Larsson et al. | |
| 2004/0218532 A1 | 11/2004 | Khirman | |
| 2004/0230572 A1 | 11/2004 | Omoigui | |
| 2004/0236945 A1 | 11/2004 | Risan et al. | |
| 2004/0250106 A1 | 12/2004 | Annese et al. | |
| 2004/0250122 A1 | 12/2004 | Newton | |
| 2004/0260801 A1 | 12/2004 | Li | |
| 2005/0038898 A1 | 2/2005 | Mittig et al. | |
| 2005/0043548 A1 | 2/2005 | Cates | |
| 2005/0047390 A1 | 3/2005 | Park et al. | |
| 2005/0080858 A1 | 4/2005 | Pessach | |
| 2005/0091167 A1 | 4/2005 | Moore et al. | |
| 2005/0091397 A1 | 4/2005 | Roberts et al. | |
| 2005/0108203 A1 | 5/2005 | Tang et al. | |
| 2005/0108248 A1 | 5/2005 | Natunen | |
| 2005/0114709 A1 | 5/2005 | Moore | |
| 2005/0144288 A1 | 6/2005 | Liao | |
| 2005/0163050 A1 | 7/2005 | Hopkins | |
| 2005/0163133 A1 | 7/2005 | Hopkins | |
| 2005/0163135 A1 | 7/2005 | Hopkins | |
| 2005/0187942 A1 | 8/2005 | Dutta et al. | |
| 2005/0203851 A1 | 9/2005 | King et al. | |
| 2005/0229243 A1 | 10/2005 | Svendsen et al. | |
| 2005/0229255 A1 | 10/2005 | Gula et al. | |
| 2005/0265259 A1 | 12/2005 | Thubert et al. | |
| 2005/0267945 A1 | 12/2005 | Cohen et al. | |
| 2006/0034177 A1 | 2/2006 | Schrempp | |
| 2006/0209819 A1 | 9/2006 | Jennings et al. | |
| 2006/0248062 A1 | 11/2006 | Libes et al. | |
| 2007/0153703 A1 | 7/2007 | Floyd et al. | |
| 2007/0153710 A1 | 7/2007 | Hopkins | |
| 2008/0319861 A1 | 12/2008 | Hopkins | |
| 2010/0042732 A1 | 2/2010 | Hopkins | |

FOREIGN PATENT DOCUMENTS

| | | |
|---|---|---|
| WO | WO 03/009524 A2 | 1/2003 |
| WO | WO 2005/074229 A1 | 8/2005 |
| WO | WO 2005/074230 A2 | 8/2005 |
| WO | WO 2008/154016 | 12/2008 |

OTHER PUBLICATIONS

Notification Relating to Priority Claim and Notification Concerning Submission or Transmittal of Priority Document with Partial International Search Report for PCT/US2005/001623, date of mailing: Jul. 12, 2005, (7 pages).

Notification Concerning Transmittal of International Preliminary Report on Patentability for PCT/US2005/001623, date of mailing: Aug. 3, 2006 (2 pages).

Notification of Transmittal of the International Search Report and Written Opinion of the International Searching Authority for PCT/US2005/001623, date of mailing: Jul. 25, 2005 (26 pages).

Findeli, M., "Peer-to-Peer (P2P) Networking," pp. 1-21, On Line, Jul. 1-21, 2001 (20 pages).

Lindemann, C., et al., "A Distributed Search Service for Peer-to-Peer File Sharing in Mobile Applications," *Peer-to-Peer Computing, 2002, Proceedings of the Second International Conference on Peer-to-Peer Computing*, Sep. 5-7, 2002.

Wiley, B., edited by Andy Oram "Peer-to-Peer: Harnessing the Benefits of Disruptive Technology," *Ch. 19 Interoperability Through Gateways*, 380-397 (18 pages) (2001).

Scarlata, V., et al., "Responder Anonymity and Anonymous Peer-to-Peer File Sharing," *Proceedings of the International Conference on Network Protocols*, pp. 272-280, Nov. 11, 2001.

Xiao, L., et al., "Mutual Anonymity Protocols for Hybrid Peer-to-Peer Systems," *Proceedings of the 23rd International Conference on Distributed Computing Systems*, May 19-22, 2003.

Zupeng Li, et al., "Research of Peer-to-Peer Network Architecture," *Proceedings of ICCT*, 312-315 (2003).

Marmor, Michael, S., "Make the P2P Lead with Toadnode," www.webtecniques.com, pp. 44-49 Dec. 2000.

Ueda, Kiyoshi, et al., "Peer-to-Peer Network Topology Control within a Mobile Ad-hoc Network," *2003 IEEE*, pp. 243-247.

Liu, J., et al., "Distributed Distance Measurement for Large-Scale Networks," *Computer Networks*, 41:177-192 (2003).

Siu Man Lui and Sai Ho Kowk, "Interoperability of Peer-to-Peer File Sharing," *ACM SIGecom Exchanges*, 3(3):25-33, Aug. 2002.

Steven Hessing, "Peer to Peer Messaging Protocol," Internet-Draft, pp. 1-57, Apr. 2002.

Mondal, A., et al., "Effective load-balancing of peer-to-peer systems," Online, Mar. 2002, XP002299388.

Andersen, S. et al., "Changes to Functionality in Microsoft Windows XP Service Pack 2 Part 2: Network Protection Technologies," Online, Sep. 15, 2004, pp. 1-56, XP002330123.

Markatos, E. P., "Tracing a large-scale peer to peer system: an hour in the life of Gnutella," Cluster Computering and Grid 2nd IEEE/ACM International Symposium CCGRID2002 Berlin, Germany, May 21-24, 2002, IEEE Coomput. Soc., US, pp. 65-74.

Shi, W., et al., "Tuxedo: A Peer-to-Peer Caching System," Department of Computer Science, Wayne University.

Hwang, J., and Aravamudham, P., "Proxy-Based Middleware Services for Peer-to-Peer Computing in Virtually Clustered Wireless Grid Networks," School of Information Studies, Syracuse University, CST 4-291.

Kim, K., and Park, D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?h1=en&lr=&q=cache:Cljbt8-S9ckJ:ideal.cecs.missouri.edu/IMC/papers/377PD . . . .

Zhuang, Z., et al., "Hybrid Periodical Flooding in Unstructured Peer-to-Peer Networks," Proceedings of the 2003 International Conference on Parallel Processing (ICPP'03) *IEEE*, (2003).

Goel, S., et al., "A Resilient Network That Can Operate Under Duress: To Support Communication Between Government Agencies during Crisis Situations," IEEE, Proceedings of the 37th Annual Hawaii International Conference pp. 1-11, Jan. 2004.

*Tiversa, Inc., et al* v. *Cohen & Grigsby, P.C.*, Civil Division, Case No. GD 07/001515, Court of Common Pleas of Allegheny County, Pennsylvania, "Complaint," 89 pages, dated Sep. 5, 2007.

*Tiversa, Inc., et al* v. *Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al* v. *Cohen & Grigsby, P.C.*, Court of Common Pleas of Allegheny County, Pennsylvania, "First Amended Complaint," 90 pages, dated Nov. 5, 2007.

*Tiversa, Inc., et al* v. *Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al* v. *Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 15 pages, dated Nov. 27, 2007.

*Tiversa, Inc., et al* v. *Cohen & Grigsby, P.C.*, Civil Division, Case No. GD 07/001515, Court of Common Pleas of Allegheny County, Pennsylvania, "Second Amended Complaint," 88 pages, dated Dec. 11, 2007.

*Tiversa, Inc., et al* v. *Cohen & Grigsby, P.C.*, Civil Division, Case No. GD 07/001515, Court of Common Pleas of Allegheny County, Pennsylvania, "Answer to Second Amended Complaint," 454 pages, dated Jan. 30, 2008.

*Tiversa, Inc., et al* v. *Cohen & Grigsby, P.C.*, Civil Division, Case No. GD 07/001515, Court of Common Pleas of Allegheny County, Pennsylvania, "Reply to New Matter," 16 pages, dated Feb. 19, 2008.

Microsoft TechNet, Changes to Functionality in Microsoft Windows XP Service Pack 2, Introduction [online Retrieved on Oct. 26, 2007] Retrieved from URL: http://technet.microsoft.com/en-us/library/bb457151(d=printer).aspx. pp. 1-3.

Microsoft TechNet, Changes to Functionality in Microsoft Windows XP Service Pack 2, Part 2: Network Protection Technologies [online Retrieved on Oct. 26, 2007] Retrieved from URL: http://technet.microsoft.com/en-us/library/bb457156(d=printer).aspx. pp. 1-37.

\* cited by examiner

PROXY NETWORK

NON-PROXY NETWORK

METHOD FOR MONITORING AND PROVIDING INFORMATION OVER A PEER TO PEER NETWORK

RELATED APPLICATIONS

This application is a continuation of U.S. application Ser. No. 11/599,180, filed Nov. 14, 2006, now U.S. Pat. No. 7,783, 749, issued Aug. 24, 2010, which is a continuation of U.S. application Ser. No. 10/764,111, filed Jan. 23, 2004, now U.S. Pat. No. 7,761,569, issued Jul. 20, 2010. The entire teachings of the above applications are incorporated herein by reference.

FIELD OF THE INVENTION

The present invention provides a method for monitoring transmissions and providing information selectively over a peer to peer network, and, in particular, to monitoring peer to peer networks to receive information, especially preselected information requests and monitoring the sources of such requests and providing information in fulfillment of each such request.

BACKGROUND OF THE INVENTION

As used herein, peer to peer networks which are the subject of the present invention comprise multiple nodes, each node typically consisting both of file server and client which can send and receive data or information to or from a node to which such is connected.

In a peer to peer network each node is connected to other nodes over a communication medium such as the internet either directly or through some type of proxy. For example, when a search request is issued such originating node sends a search request to all of the nodes to which it is connected. (see FIG. 1) These nodes search their list of available files and if a match is found they send a response back with the location. However, a peer to peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to node A. FIG. 3 discloses a nonproxy loop network wherein each node is directly connected to another.

Some peer to peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them.

In peer to peer networks, information searches are sent to the nodes to which they are connected and, in turn, each of those nodes send the information request to other nodes to which they are connected. The current peer to peer networks do not have a centralized search means as did the "older" networks, such as Napster and the like. Since most of the newer peer to peer networks lack centralization, it is difficult if not impossible to control the information content that is transmitted and received over the network. This is especially of concern with respect to the use of such networks to send specified information to and from requesters on the network where that information is either not available for such distribution or the material is of societal concern, especially to minors.

Various attempts have been made to discourage or disrupt such network transmissions and receptions. However, these attempts have not generally proven successful, especially in the "older" peer to peer networks. And, notwithstanding such attempts, the peer to peer networks have grown and the volume of either illegal or improper traffic has grown and has deprived many information owners of their property.

Accordingly it is an object of the present invention to provide a method for monitoring peer to peer networks for selective information requests and to provide information in response to such requests. It is yet another object of the invention to provide a method for reducing the number of nodes on a peer to peer networks that receive the information requested. It is another object of the invention to provide a method for monitoring selective or preselected requests for information over a peer to peer network and to protect against unauthorized receipt of information requested. It is yet another object of the invention to provide a method for monitoring all or selective information transmitted or requested over peer to peer network to provide a record of such transmissions and requests by means inter alia client IP addresses. It is a further object of the invention to provide at least one pseudonode to reside on a peer to peer network.

SUMMARY OF THE INVENTION

Generally, the present invention provides a method for monitoring search requests for selected objects by a node on a peer to peer network having at least two nodes and providing a response to substantially all of such requesting nodes. The preferred method comprises the steps of:

a. interposing at least one pseudonode on a peer to peer network, where the pseudonode may be configured to provide at least one IP address and, optionally, at least one network address, wherein the pseudonode includes at least a representation of a selected object stored thereat;

b. monitoring said network through at least one of said pseudonode to detect requests matching said at least one of said stored object representations;

c. responding to substantially each requesting node with information representing an advertising.

Thus, the present invention provides a method for monitoring peer to peer networks using at least one pseudonode to receive search requests and to respond to such requests by providing advertising information to at least one or more requesting nodes on such network. The invention does not require that all such responsive information be identical to the information requested.

This invention also provides a method wherein at least one pseudonode reviews each search request on the network against a preselected criteria of information or actions. If a search matches preselected criteria, then the pseudonode will limit the transmission and retrieval of the selected data by responding with different information, such as advertising information.

These methods are also useful in peer to peer networks where specific nodes cache file information by configuring the pseudonode to specifically address the caching nodes in the network.

These methods include:

1. Sending a response that it has the data, such data not actually being the requested information, but different data such as advertising, or not having any data at all.

2. Sending a response by impersonating a node on the network.

3. Sending a response by impersonating multiple nodes such that the data appears to be available from multiple network nodes rather than the pseudonodes.

4. Sending a response that causes the originator of the search to cease to function or severely limit its operation.

5. Sending a response that lists random file names or file sizes available from single or multiple nodes on the network.

6. Sending a response back that fills the node's display window with irrelevant information.

To appear as a peer node on the network, the pseudonode uses its configured list of addresses or an address generated at random by the pseudonode. These addresses may or may not exist on the peer to peer network. However, if these addresses do not exist on the network the pseudonode will make it appear as though they do.

Another method is to eliminate searches from the network. The pseudonode is configured to represent itself on a proxy based network as a network node, for example, by the method described above. As network nodes issue search requests that pass through the pseudonode it compares each search request to a set of preselected criteria or criteria that is based on an expert system or fuzzy logic.

Finally, most nodes on a peer to peer network can only support a defined maximum number of connecting nodes. In such case a pseudonode of the present invention is configured to appear in the network as multiple nodes that make multiple connections with network nodes. These multiple connections reduce and limit the network nodes' ability to accept connections from other network nodes.

In another embodiment of the invention, a pseudonode is configured to connect with multiple network nodes. This method is particularity useful in extremely large networks that contain a large number of nodes. In addition, multiple pseudonodes can be configured to connect with different network nodes to increase the opportunity of receiving search requests for selected criteria. These multiple pseudonodes can be located at one physical location or at many different physical locations to increase the chance of receiving search of preselected criteria.

In the case of multiple pseudonodes, it is preferable to configure such pseudonodes to share a common list of connected network nodes such that each pseudonode is configured to manage connections that are not to the same network nodes. Alternatively or in connection therewith, the multiple-pseudonodes can also be configured to detect, store and manage the IP and network addresses of the network nodes for the multiple pseudonodes.

In another embodiment one, or a plurality of, pseudonode compares searches to the preselected criteria and passes to a second pseudonode the address of a network node that has initiated a search. The second pseudonode is configured to send information to the network node that initiated the search. The information that is sent, in the case of searches for unauthorized materials, may be different information, such as advertising information, incorrect or incapacitating. The first pseudonode, optionally, drops the search from the network so that other network nodes do not respond.

In all of the embodiments, the pseudonode is configured to have one or more of the features set forth below. These features are employed in the methods of monitoring peer to peer networks to provide enhanced search and response capabilities compared to the network nodes in the particular network being addressed. Thus, not all of the capabilities need to be programmed into each pseudonode in order to monitor and respond in the network. The presently preferred configurations include:

The pseudonode is configured to connect to a large number of network nodes. Typically network nodes in peer to peer networks support 1-10 connections the pseudonode can be configured according to the invention to support thousands or millions.

The pseudonode is configured to change its peer to peer network reported IP address.

The pseudonode is configured to change its IP address on selected event occurrences.

The pseudonode is configured to change its client ID on selected event occurrences.

The pseudonode is configured to change its GUID on selected event occurrences.

The pseudonode is configured to generate multiple search responses that contain randomized file names and file sizes from randomized network nodes.

The pseudonode is configured to generate search responses that contain the same file with different file sizes so as to diminish the ability of network nodes to sort them for the user.

The pseudonode is configured to impersonate multiple network nodes.

The pseudonode is configured to respond to searches with information such as an advertisement.

Other advantages of the present invention will become apparent from a perusal of the following detailed description of presently preferred embodiments of the invention taken in connection with the accompanying drawings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

With reference to FIGS. 1 through 4, the preferred methods of the present invention advantageously utilize at least one pseudonode. The pseudonode can take on the appearance of or be any node shown in FIGS. 1 through 4, and has certain preferred attributes. These attributes are configured for the specific type of monitoring of peer to peer search requests and response desired by the end user. In monitoring peer to peer networks for the search and transfer of files that are authorized by the owners thereof, the pseudonode is preferably configured to change its reported peer to peer network IP address. It also is preferably configured to change its IP address on selected event occurrences and to change its client ID. In certain tasks, it is preferably configured to change its GUID for selected event occurrences.

In one preferred embodiment of the present invention, a pseudonode comprises both a hardware system such as a computer, thin appliance, ASIC based device or other similar device, which can be programmed with specific logic or programming code (i.e. software). In the preferred embodiments, the device preferably has the capability of being connected with a physical network either directly or though the use of a gateway. The programming logic provides the device with the capability to transmit and receive on both physical networks as well as the peer to peer networks which typically ride on top of a physical network. In the preferred embodiment of the invention programming logic is a software program but may also be hard coded non-changeable procedural information such as typically found on an ASIC based device.

Figure 9A:
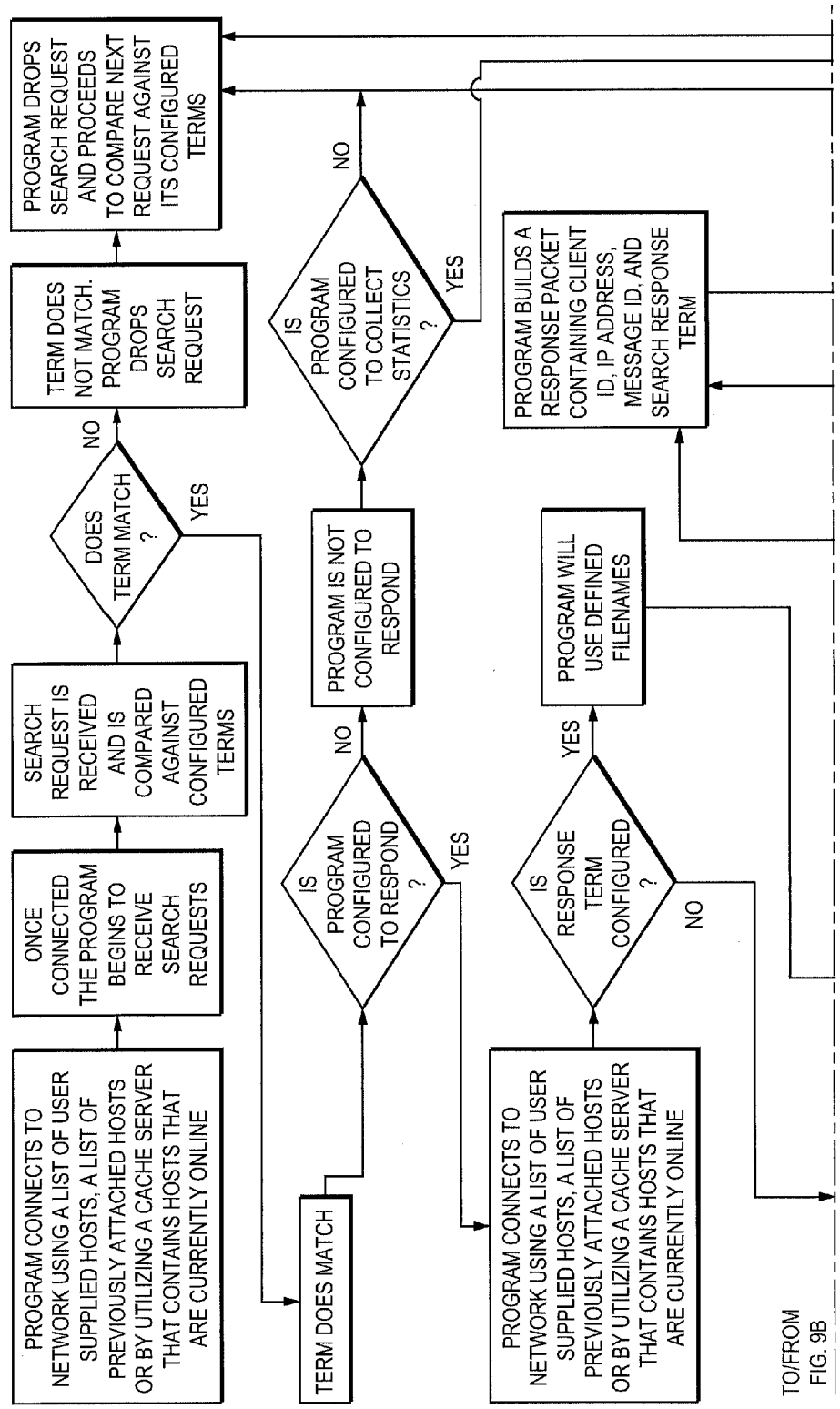
FIGS. 9A and 9B show a flow chart representation of the programming or configuring a pseudonode to execute certain preferred methods of the present invention.
Figure 9B:
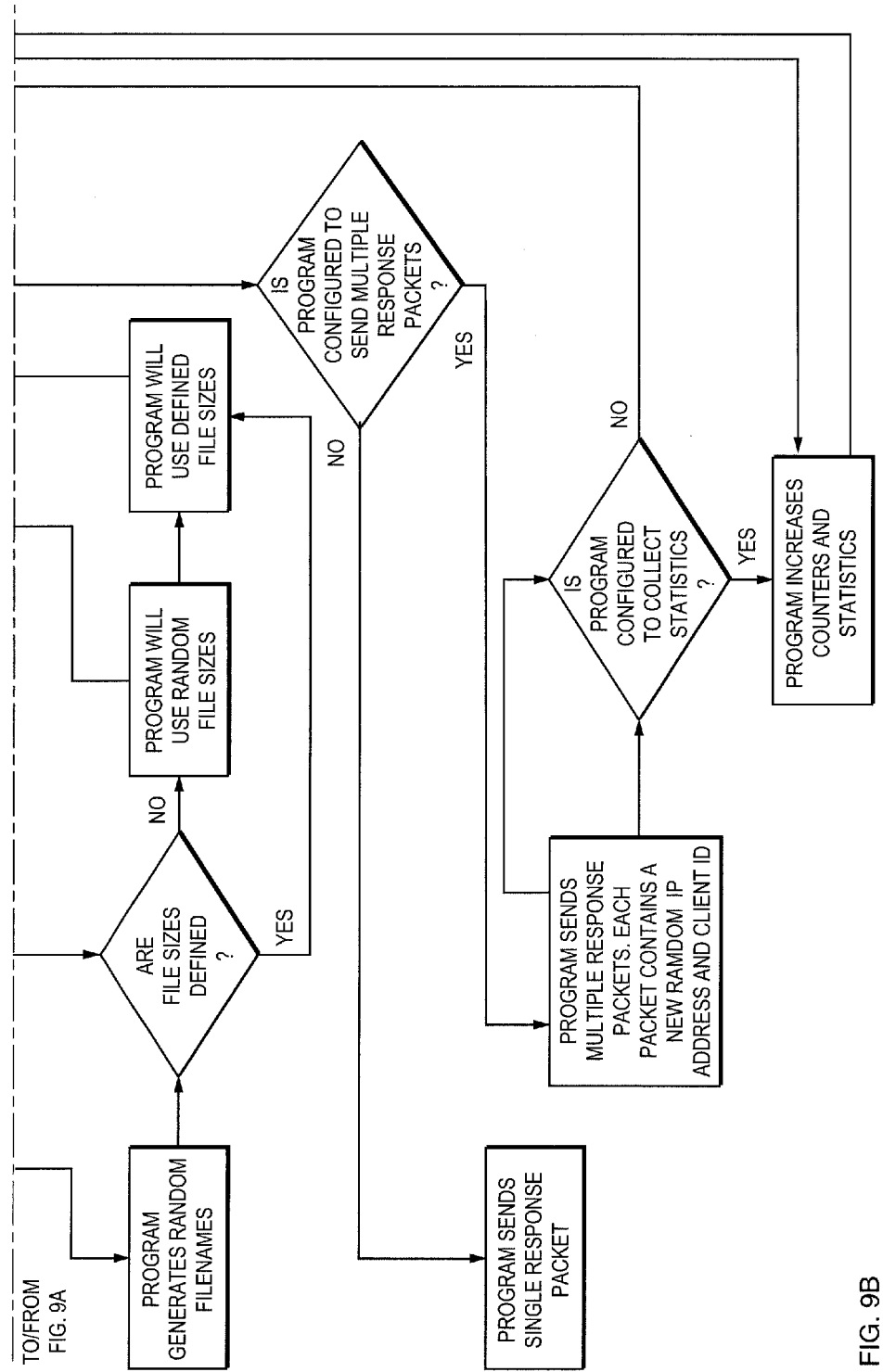

Referring generally to FIGS. 9A and 9B, a flow chart discloses one method for the programming logic that configures a device acting as pseudonode to attach to a peer to peer network. This pseudonode accepts search requests and responses from nodes participating on the network. These nodes can originate search requests or responses or they can forward a search or response as part of their participating in the network. If a match is made between a search query and configured terms, and the programming logic is configured to respond, it can respond with random information, or predetermined information such as messages, advertisements, or warnings. It can also be configured to respond with a pointer to a file that is an advertisement, a lower quality version of a file, a demo version of a file, a sampling of a file, an advertisement that contains reference to the search. The file might contain an advertisement that is a product placement ad, or a music or video file that contains an advertisement. For instance, if someone is searching for "Pepsi", the program could respond with a file that contains advertisement information for Pepsi. This advertisement can be located on a dedicated server that doesn't necessarily participant in the peer-to-peer with the exception of answering connection requests and requests for content referenced by the program. The program could also provide pointers to itself and offer the content.

The programming logic is configured to receive search requests and responses and compare them to a list of items that have been entered into it by the user and to then perform some event whether or not a match is found. The programming logic may elect to drop the search request or response and not pass it on to other nodes. This election can be automatic depending on trigger points such as load or it can be configured to do so by the user of the programming logic. The programming logic may also elect to respond with information that is different from the requested information, such as advertising information. The advertising information can be selected in response to the request. The advertising information provided in response to the query could be a file, a message, or a pointer to a file. The advertisement might be a product placement ad, or a music or video file that contains an advertisement. The file could be located on the pseudonode, or on a different system. This system could optionally be dedicated.

The method for comparing may include inter string, complete string, partial string, fuzzy logic, patricia tree or any other method that could be used to compare the likeness of two or more strings or portions of two or more strings. String comparison can occur in parallel with other searches to increase throughput or they can be compared serially (meaning one after another). If a match is made, the programming logic can build a response to the search request if it is programmed to do so. This search response optionally contains the IP address of the pseudonode and the peer to peer client ID of the programming logic. Because peer to peer networks utilize path routing as opposed to address routing, and because client addresses are not managed by a central authority but rather chosen at random, the response can be built to include any IP address and any client ID address that the programming logic selects, whether or not it exists.

There are no requirements for which files or file sizes are reported in the response. Thus the programming logic can be configured to return random file names or file sizes or specific file names and file sizes. The programming logic can also be configured to send the same search request out onto the network and reply back to the original searcher with the filenames and file sizes that are returned to it. The programming logic can also be configured to merely forward on the original search request and when replies are received it will replace the IP address and client ID with random values and forward it back to the original searcher. The programming logic can be configured to send many search responses each with a different IP address and client ID to make it appear that multiple nodes have the information.

Peer to Peer networks utilize path routing as opposed to address routing. With path routing each search request is tagged with a unique ID that is generated when the search request is created. As the search request is passed from one node to the next, each node records which path the search request was received on. At that point forward, if a node receives a search request with the same message ID from another path it will drop the search request. It does this to prevent duplicate search requests caused by loops in the network. Using this path routing method enables search responses to travel back the same path that the search request took. The programming logic can be configured to accept a search request from a node and pass the search request on to other nodes. When these other nodes respond back with response messages, the programming logic can be configured to drop the response. This prevents the original node that initiated the search from receiving results in two ways. First, because the pseudonode dropped the response, the searching node will not receive these responses. Secondly, other nodes will not respond to the original searching node if they would receive the message from other paths because they have already seen the message ID and would have dropped the search request as a duplicate. The pseudonode can also be configured to accept a search request from a node and replace the search string with a random set of numbers and characters but keep the same message ID. It would then forward the message on to other nodes. This prevents the original node that initiated the search from receiving results because no matches will have occurred to generate responses. Further-more any nodes that received the search request with the correct search term will not respond because they would have already seen the same message ID and would drop this message as a duplicate.

The programming logic can also be configured to look for certain search terms and respond back with a file that contains information that informs the user they are violating copyright laws. This information may be an audio or visual message such as a recording in an audio file or a message in a document file. The filename may also be a message, for instance, "Warning_you_are_violating_copyright_laws.txt."

Nodes on peer to peer networks can be asked to send a file to other nodes. This is called "Pushing" the file and is usually used when nodes are behind firewalls. As described below, the present invention utilizes this feature of peer to peer networks to obtain a node's identity. Thus, when a node is firewalled, connections can not be made to it, thus if it is sharing files no nodes will be able to retrieve them. "Pushing" solves this problem by asking the node that is firewalled to make an outbound connection which usually is not protected. Any client can initiate a push request. The only information required is the client ID of the node that will push the file and the file index number of the file that is being requested. The push request contains this information as well as the TCP/IP address and port of the node that is requesting the push. When a node receives a push request it compares the client ID in the message with its own. If it matches, it then looks to see if it has the file index number that is referenced. If it exists the node attempts to connect to the requesting node over TCP/IP using the IP address in the request. Once connected the node sends a header that comprises of its client ID, the file index number and the file name. The requesting node will then proceed to have the file uploaded to it.

The programming logic can be configured to utilize this "Push" method to obtain the IP address of most nodes. The programming logic would be programmed with the other nodes client ID and a file index number. The programming logic would then issue the push request on the network. The node in the push request would receive the message and attempt to push this file to the pseudonode. The node's real IP address will be exposed once an out of band connection over TCP/IP is made between the node and the programming logic. The node will then send its client ID, file index number, and file name. The programming logic will store this information and disconnect the connection before the file is transferred. At this point the programming logic has a list of the correct IP address to client ID correlation.

This method also can be used to obtain a list of files on a node. On peer to peer networks files are only found by keyword searching. There is no way to ask a specific node for a list of files. Using the method above the programming logic would be configured with the client ID of a node and a file index of "1." It would issue the request to the node and when the node connects to the pseudonode and sends the header information it will record in a table the filename and client ID. It will then drop the connection before the file is transferred. The programming logic will then increment the file index number to a "2" and repeat the procedure. It will then record the information for file index 2. The programming logic will continue to increase the file index number and repeat the process until the node no longer responds.

It is known that certain ranges of IP addresses usually cover certain geographical ranges, such as a city or town. Authorities can use this file listing feature along with IP ranges of known terrorist states to review and search for terrorist activity by looking at what files are available on these nodes and by downloading them and reviewing them. Companies may also use this feature to look for copyrighted information on a specific computer. Companies may also use the information gathered for use in statistics or to build user profiles based on what they've downloaded or are sharing.

The programming logic can be configured to keep track of searches and searches that have matched certain criteria. The programming logic can be configured to accept numbers that are used against these statistics to calculate dollar amounts such as business losses. For instance the programming logic can be configured to keep track of the search term "mp3" and multiply it by "15" and present this number to the user as a business loss. These numbers can also be recorded for "Before and after" comparisons.

The programming logic can be configured to look for searches that contain specific terms and therefore can be used to detect if any user on the network is searching for them and if anyone is responding. This would be useful for a software company to find out if their software is being pirated, how much, and by whom.

The programming logic has the ability to store in a table client IDs and IP addresses by looking at search responses and stripping off the client ID. With the client ID it can then build a push packet to be used to detect the IP address of the node and this information can be stored in a file. This information can be used to generate statistics on the growth and size of the network. It should be noted that in many of the monitoring applications of the invention it is not necessary to have a list of preselected data objects to search against. It is possible to monitor to all search requests and record those for reporting or statistical functions.

The programming logic can be configured to record both search requests and their responses. This information can be written to a file which can later be used in a court of law or for other purposes which require documentation.

The programming logic can be configured to record attribute information received from a node. For instance the programming logic may send out a search request for "mp3" and then record information such as the IP addresses or the client IDs of those nodes that respond.

In one embodiment of the invention, it is desirable to convert pseudo IP addresses of peer to peer nodes into real ones. Peer to peer networks are often session level networks that ride on top of the Internet. Nodes on peer to peer networks have network numbers that are not managed by any authority and because of this unauthorized recipients of information and files are hard to locate. (The internet is comprised of nodes, each with specific addresses that are managed by the ARIN (American Registry for Internet Numbers) authority making it relatively easy to find out who is responsible for a specific computer on the Internet.) While nodes on the peer to peer network do have true network IP addresses so that they can communicate with their direct neighbors they do not have to transmit valid IP addresses in their peer to peer network messages.

Figure 5:
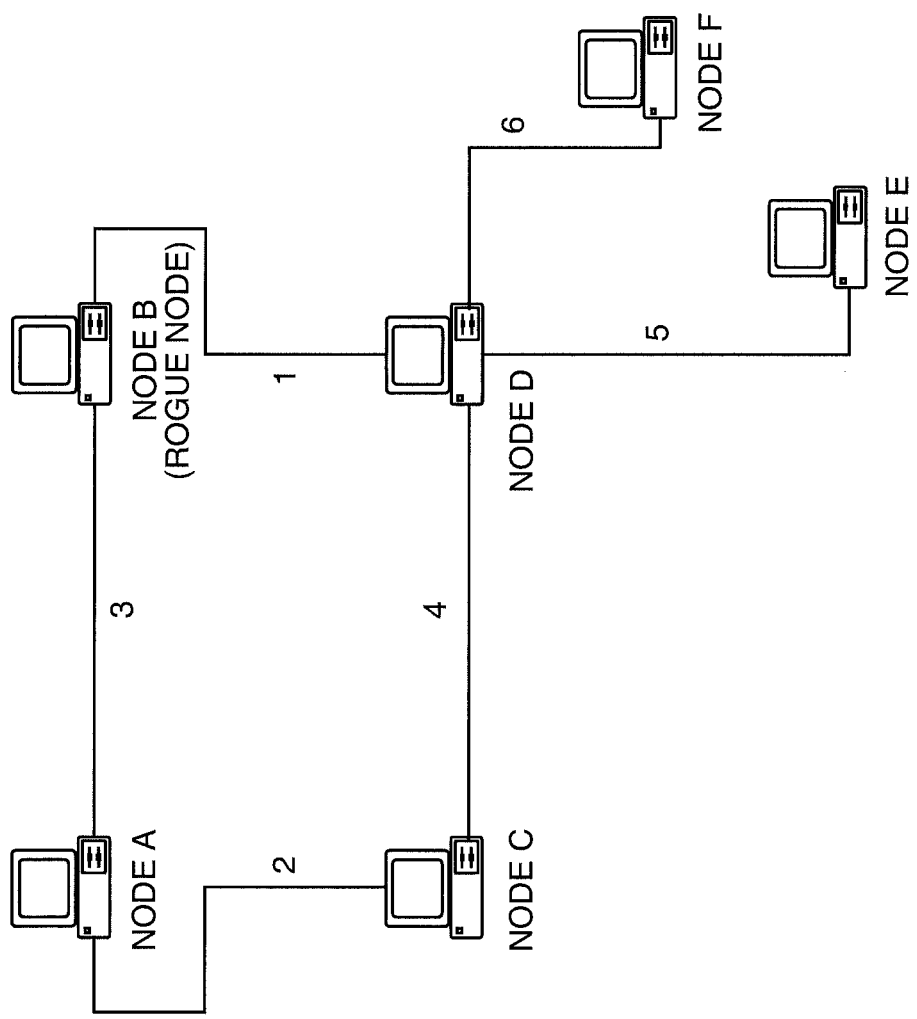
FIGS. 5 and 6 are schematics representation of a network wherein node B is a pseudonode used in the just seen method of the present invention to defeat search requests.
Figure 6:
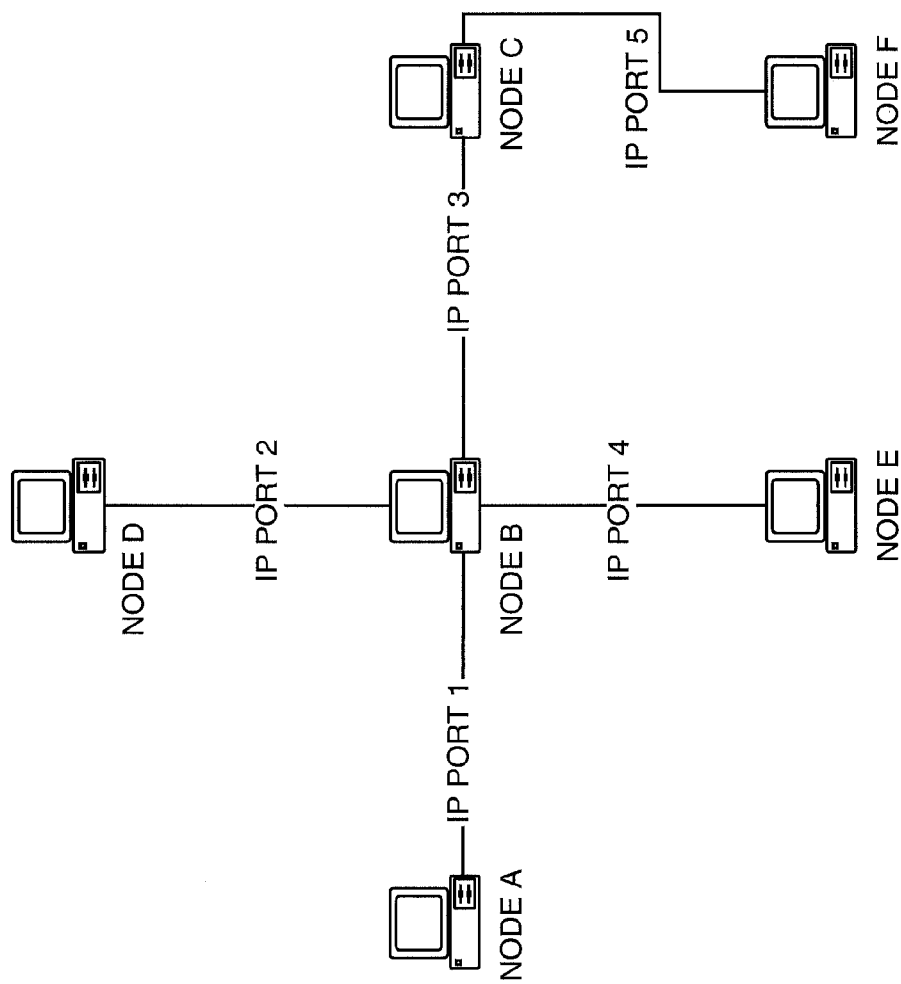

Referring generally to FIGS. 5 and 6, peer to peer networks utilize message ID/path routing so they do not need to transmit valid IP addresses to function. Every message that is sent on a peer to peer network has a unique message ID assigned to it. This message ID is a unique 16 byte number and is generated when each new message is created. As peer to peer nodes receive messages, they record which IP port it was received on along with the message ID so that if there is a response they will know how to route it back.

Using the network depicted in FIG. 6, if Node A attempts to acquire the file "Yellowstone.txt" it generates a search request with a message ID of "abcdefg" with the search term of "Yellowstone.txt" and forwards the request to node B. Node B records that it received a message with an ID, for example, "abcdefg" on port 1. Node B then forwards the search request to Nodes C, D, and E. Node C records that it received a message with an ID "abcdefg" on port 3. Node D records that it received a message with an ID "abcdefg" on port 2. Node E records that it received a message with an ID "abcdefg" on port 4. Node C forwards the search request to Node F. Node F records that it received a message with an ID "abcdefg" on port 5, for example. All nodes search their local files and only Node F has a match. Node F will look up the message ID "abcdefg" in its tables and see that it received it on port 5. It will generate a response message that comprises of its IP addresses, a file index and its peer to peer network address. It will then send a response out port 5. Node C will receive the response message and look in its tables for message ID "abcdefg" and see that it was received on port 3. It will then forward the response out port 3. Node B will receive the response message and look in its tables for message ID "abcdefg" and see that it was received on port 1. It will then send a response out port 1 but not out ports 2 & 4. Node A will receive the response and look in its tables for message ID "abcdefg" and find that it initiated the search and will then process the packet.

As well known, peer to peer network nodes allow a user to enter in any IP address they wish to identify themselves. This IP address is encapsulated in the response message along with a peer to peer client ID that is a unique 16 digit number. This client ID is randomly generated but the node does not change it until it is restarted. The IP address that is encapsulated in the response is used by the searching node to contact the node with the file out of band (out of network). On peer to peer networks search and control communications occur on the peer to peer network but file transfers occur at the Internet or true network level. Without a correct IP address the node looking for the file would not be able to retrieve the file. Many nodes on the peer to peer network randomize their IP address to avoid disclosing their identity. Without the knowledge of what a node's true IP address is, anyone searching for the node would not be able to locate its true identity. It is therefore beneficial if a pseudo IP addresses can be converted to a true IP address.

The present invention provides for a method to locate the true IP address of the node by utilizing the method that peer to peer networks use to evade firewalls. In a peer to peer network if the requesting node can not contact the node who holds the file, the requesting node can issue a "Push" request to the node that holds the file. This is done by sending a specialized message to the client ID that was encapsulated in the original search response message. This push request triggers the node that contains the file to connect to the requesting node and upload the file. Once the node that contains the file connects to the requesting client, its true IP address is exposed and can be captured.

Figure 7:
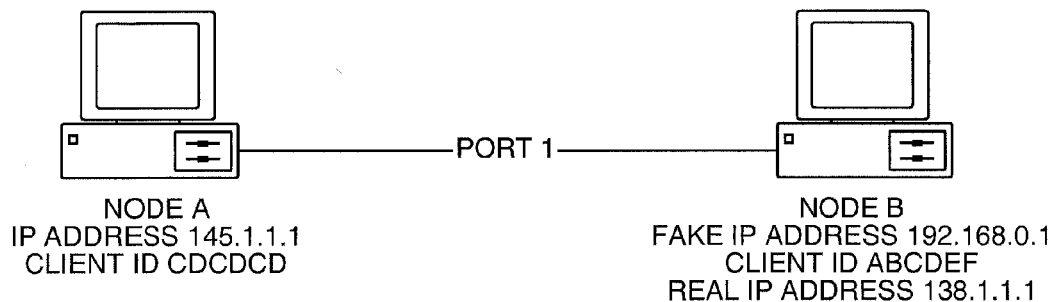
FIG. 7 is a simplified schematic for use in illustration of locating a nodes true IP address.

With reference to FIG. 7, Node A is a pseudonode that issues a search request to Node B with a message ID of "123456" for the file "Madonna.mp3." Node B records that it received a search request with a message ID of "123456" on port 1. It searches its list of files and locates "Madonna.mp3". It sends a search response message to Node A that contains the filename, file index, its pseudo IP address of "192.168.0.1" and its client ID of "ABCDEF". Node A receives the search response and records the client ID of node B in a table. It then creates a push request for client ID "ABCDEF" for the file index that was returned. It then sends this push request to Node B. Node B receives the response and finds that it is a push request for itself Node B connects to Node A out of band over the transport network (i.e. the Internet). Node A accepts the connection. Once connected Node A now has the true IP address of Node B because for Node B to communicate with Node A out of band Node B must expose its true IP address. Node B then sends a message that contains its client ID, the file name, and the file index of "Madonna.mp3." Node A looks in its tables for the client ID, finds that it has sent a push request and records the true IP address. It then drops the connection without receiving the file. Node A now has the IP address and client ID of Node B.

It is important to be able to identify all files that a network node is sharing in a peer to peer network. Currently on peer to peer networks the only way to locate files is by keyword searching and therefore unless the searcher knows what files a node is sharing they can not see all of the files that are available. If a node on the network is sharing unauthorized files, such as a copyrighted movie or song, it is desirable to see any other unauthorized files the node may be sharing. This invention provides a method for viewing all files that a specific node is sharing by creating multiple "Push" requests and recording their responses.

The "Push Request" functionality was engineered into peer to peer networks to get around nodes that were firewalled. In a peer to peer network, nodes query for files using the peer to peer network but retrieve files from other nodes by directly connecting to them and requesting the file. If the node that contains the file is firewalled then no connections are able to be established with it. To get around this problem, engineers of the peer to peer networks devised a way that a specialized packet can be sent through the peer to peer network to the firewalled peer to peer node requesting that it "Push" (upload) the file to the requesting node. Because the firewalled node is allowed to make outbound connections through its firewall, it can successfully transfer the file to the requesting node as long as the requesting node is itself not firewalled.

The push request contains four key fields. The first is the peer to peer client ID of the node that holds the file. The second is a file index number. The file index number is a numerical representation of the file being shared. When a node first starts up, it indexes its files that are available, starting with 1. For example:

file1.txt file index 1
file2.txt file index 2
file3.txt file index 3
file4.txt file index 4

The third field is the IP address of the requesting node. The fourth field is the TCP/IP port number of the requesting node.

Once the requesting node builds the push request it transmits it to the network. Each node on the network looks at the message and if the client ID is its own it will process it. (see FIG. 8) If a node finds that it is being requested to push a file and if the file index exists on the node, it will attempt to connect out of band to the requesting node. Once connected, it will transmit a header that contains its client ID, the file index and the name of the file. It will then attempt to send the file. Because the node sends the file name in the header there exists a method to locate all files that the node is sharing by sending multiple push requests that request different file indexes. Preferably the push request would start at a file index of "1" and continue on incrementally (i.e. "2", "3", "4") and stop when the other node no longer responds with file names.

Figure 8:
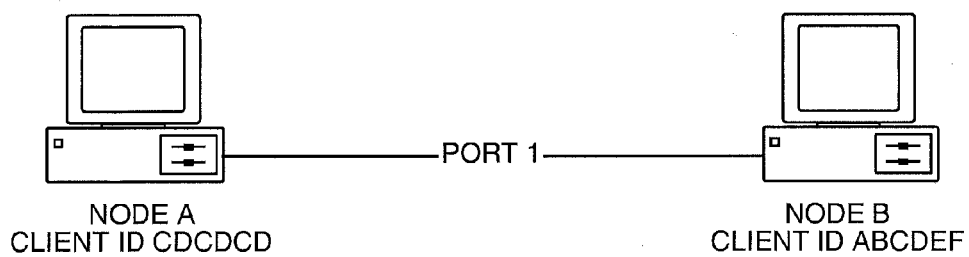
FIG. 8 is a simplified schematic for use in illustration of locating all files that a node is sharing or has downloaded.

In FIG. 8 Node A is a pseudonode wishing to get a list of all files that Node B is sharing. Node A builds a push request that contains its IP address, its TCP/IP port, the client ID of Node B (ABCDEF) and the file index of "1." Node A then sends this request to Node B. Node B realizes that the client ID is itself so it processes the request. It looks up file ID "1" and finds that it is "madonna1.mp3". It attempts to contact Node A out of band through the IP address and port that was in the push request. Node B connects to Node A and sends a header which contains its client ID, the file index "1" and the file name of "madonna1.mp3." Node A then disconnects before Node B can transfer the file. Node A then repeats the same steps over except this time, it sends a push request with a file index of "2" to Node B. Node B receives the push request and realizes that it is for itself so it processes the request. It finds that file index "2" is for "sting1.mp3". Node B connects to Node A out of band through the IP address and port that was in the push request. It then sends a header which contains its client ID, the file index "2" and the filename of "sting1.mp3." This procedure occurs over and over again and each time Node A increments the file index number. Once Node B stops responding to Node A, Node A will realize that Node B is not sharing any further files.

EXAMPLES

The following Examples illustrate various embodiments of the methods according to the present Invention. For Examples 1-6, refer to FIG. 1.

Example 1

Figure 1:
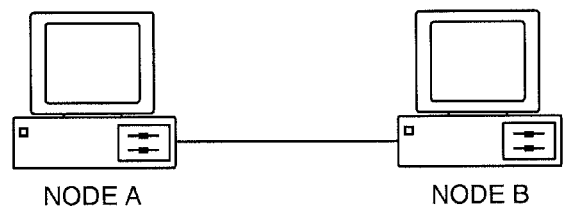
FIG. 1 is a simplified schematic of a two node peer to peer network.

This example illustrates a method for responding to a request on a peer to peer network. Referring to FIG. 1, Node B is acting as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X", Node B will send back a response to Node A that it has the file named "X" when in reality it does not. When Node A attempts to retrieve the file from Node B an error condition will result because the file does not exist on Node B. This limits data transmission and retrieval in two ways. First, because other nodes may have responded to Node A the node will have to sort through all results choosing the correct file to retrieve. This increases the time it takes to successfully retrieve the file. Secondly, Node A's time and resources will be consumed if Node A attempts to retrieve the file from Node B because the file does not exist. This causes Node A confusion and frustration because of reoccurring failures.

Example 2

This example illustrates a method for responding to a request with data different from that requested. In this case Node B is acting as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back a response to Node A that it has the file named "X". When Node A attempts to retrieve the file from Node B, Node B will send a different file then what is expected. This file can be any file and its purpose is to make Node A believe that it is downloading the true file "X." This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from Node B because the file is not the correct one. This causes Node A confusion and frustration because of reoccurring failures.

It should be understood that the "different file" sent in response to the request can include advertising information. If for example the search request was for a file called "madonna.mp3" the downloaded file may contain an audio advertisement. The advertisement itself may be related to the search request; e.g., the audio advertisement may be for a vendor of an authorized copy of the requested mp3 file on a compact disk (CD).

Example 3

This example illustrates the impersonation by a pseudonode of a network node. Thus, Node B acts as a pseudonode and is configured to respond to any node issuing a search request for a file named "X." When Node A issues a search request on the network for a file named "X" Node B will detect this search and compare Node A's search string to its configured list of strings. Because Node A is searching for a file named "X" and Node B is configured to respond to searches for a file named "X" Node B will send a response to Node A that Node C has the file named "X" when in reality Node C does not exist on the network. When Node A attempts to retrieve the file from Node C an error condition will result because Node C does not exist. This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from Node C because Node C does not exist. This causes Node A confusion and frustration because of reoccurring failures.

Example 4

In this example, a pseudonode acts as multiple network nodes to make information appear to be available from multiple network nodes. In this case, Node B acts as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back multiple responses to Node A that multiple nodes have the file named "X" when in reality these nodes do not exist on the network. When Node A attempts to retrieve the file from any of these non-existent nodes an error condition will result because these nodes do not exist. This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from non-existent nodes because the nodes do not exist. This confuses Node A and creates frustration because of reoccurring failures.

Example 5

This example illustrates a method for responding with a list of random file names or sizes from at least one network node.

In this case Node B acts as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back responses to Node A that either a single node or multiple nodes have variations of the file named X. For example if the file was named "hopkins.txt" with a file size of 1,000 bytes Node B will send responses that Node C has a file named "hopki.txt" with a file size of 1,000 bytes even though Node C does not exist on the network. It may also add variations to the file size, for example changing the 1,000 bytes to some random number such as 2,002. These random file names and file sizes can be generated randomly or Node B can be configured with a list of names and sizes to reply with. For example Node B can be configured to reply with "hopki.txt" whenever a search for "hopkins.txt" is requested. When Node A attempts to retrieve the file from any of these non-existent nodes an error condition will result because these nodes do not exist. This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from non-existent nodes because the nodes do not exist. This causes Node A confusion and frustration because of reoccurring failures.

Example 6

This example illustrates a response from a pseudonode that fills the requesting nodes display window with irrelevant data. In this case Node B is acting as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back enough responses to fill up node A's display window. These responses will contain information that multiple nodes have the file named "X" when in reality these nodes do not exist on the network. When Node A attempts to retrieve the file from any of these non-existent nodes an error condition will result because these nodes do not exist. This limits data transmission and retrieval in three ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from non-existent nodes because the nodes do not exist. This causes Node A confusion and frustration because of reoccurring failures. Third, because the display window of Node A will be filled with invalid information further information from valid nodes will not be able to be displayed.

Example 7

Figure 2:
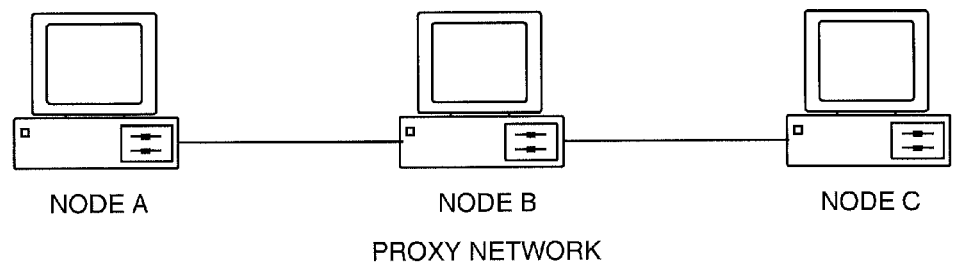
FIG. 2 is a simplified schematic of a peer to peer proxy network.
Figure 3:
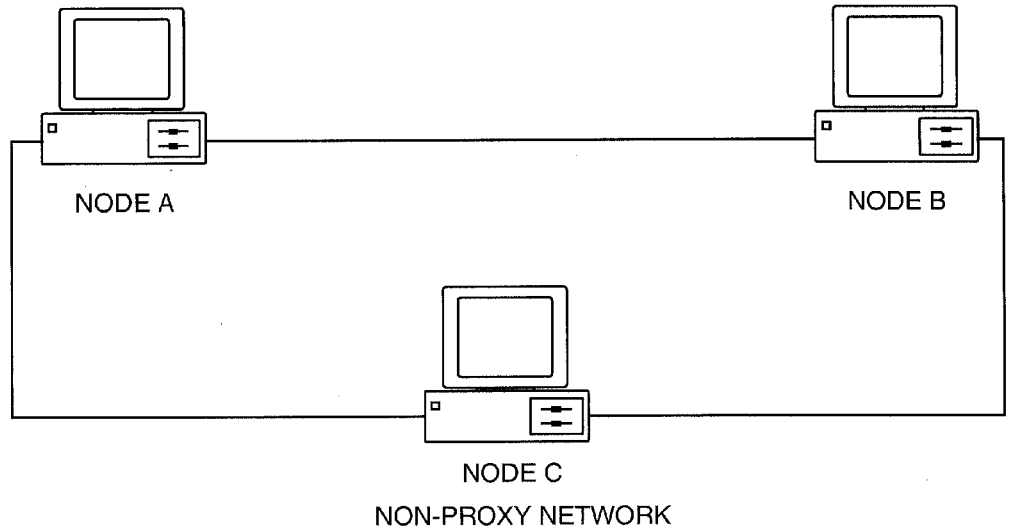
FIG. 3 is a simplified schematic view of a peer to peer, nonproxy, loop network.
Figure 4:
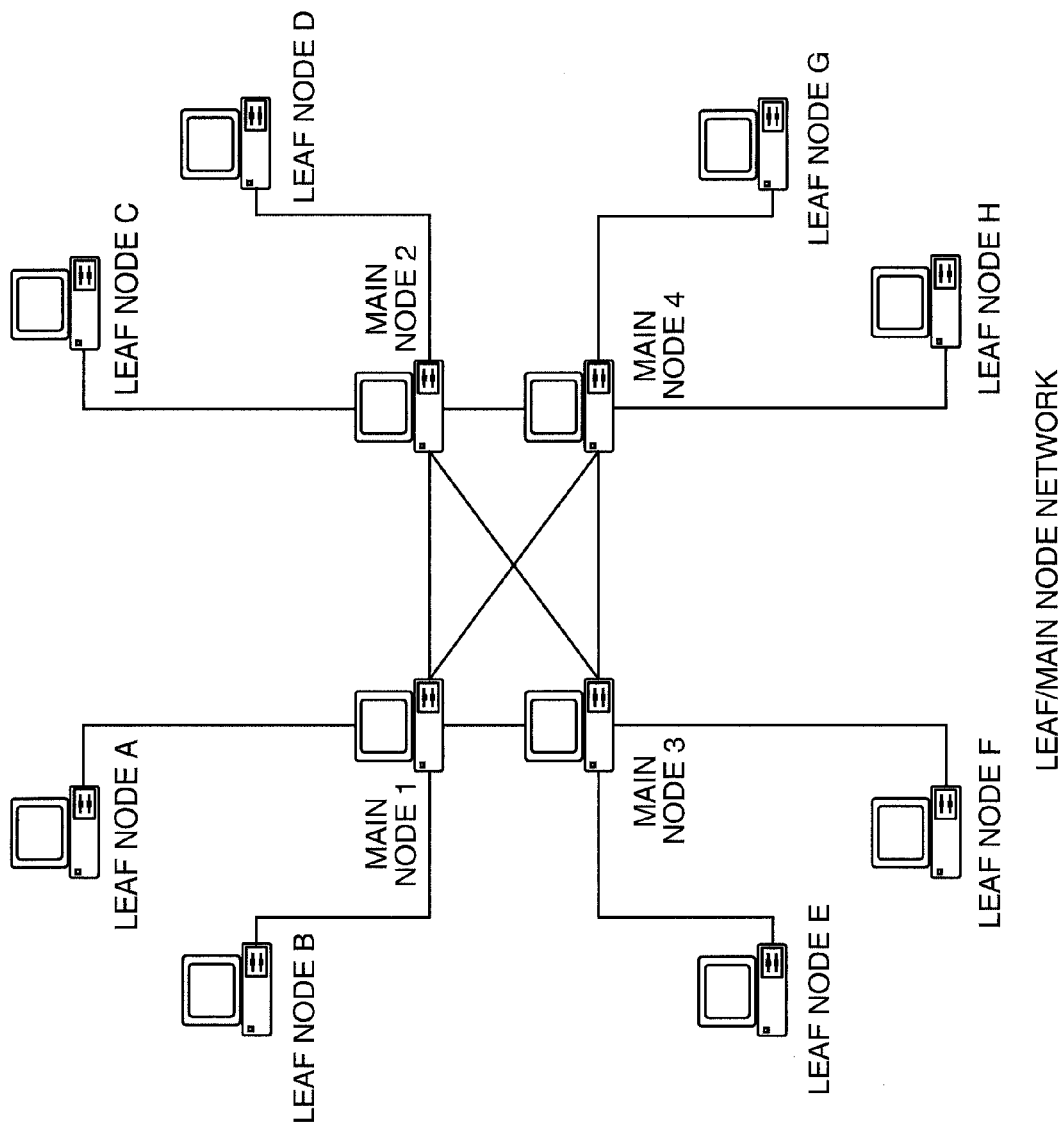
FIG. 4 is a simplified schematic of a peer to peer leaf/main node network.

Referring to FIG. 2, this example illustrates an embodiment for reducing or eliminating searches on a peer to peer network. In this case, Node B is acting as a pseudonode and a proxy. Node B is configured to drop any search requests for the file "X." This effectively removes searches for "X" from the network and prevents other nodes from responding with valid results.

When Node A issues a search request on the network for a file named "X" Node B will detect this search and compare Node A's search string to its configured list of strings. Because Node A is searching for a file named "X" and Node B is configured to drop searches for a file named "X" Node B will drop the search request and not forward it to Node C. Node A will assume that because it did not receive any search responses back that its search did not match any files on the network.

Example 8

Referring to FIG. 6, this example illustrates another embodiment for frustrating the unauthorized downloading of files over a peer to peer network. In this example, the method is applied to network having low bandwidth. In Example 9, a method is described for higher bandwidth networks.

In peer to peer networks, each search request that is sent out has a unique message ID associated with it. No other request will have the same message ID. When a node receives a search request it records which connection the search request came in on as well as the message ID. If the node should receive the same message ID from a different connection it will not respond to it or forward it, but will instead drop it. The node does this because in peer to peer networks it is possible to have a loop in the network as described in FIG. 3. If the node were to respond to both messages it would be in essence responding twice and which wastes bandwidth on the network. If a node that receives the request has files that match, it will send the results back through the connection that first received the message.

A method of search result reduction can be employed where a pseudonode of the present invention accepts the search packet from a node, strips the search term from the packet and replaces it with a randomized character string while keeping the same message ID. This modified packet is then sent onto the network. As network nodes receive the search request they will record the message ID and drop any future messages they may receive with the same message ID. Because the search term in the search request was replaced with a random character string it should not match any files on other network nodes. As a result these other nodes will not respond to the message ID of the real search term if they receive it from different routes.

Utilizing the above method and referring to FIG. 6, each node on the network except for node A has the file named "X" available. In this network node B is the pseudonode and is configured to utilize the just seen saturation method described above if it encounters a search for the file named "X."

In this example, Node A searches for file named X by issuing a request to its connected network nodes (node B and node C). This search request has a message ID of "abcd". Node C records that it received a search request from connection 2 with a message ID of "abcd". Because node B is configured to look for searches for file X and because node A sent it a request for file X, node B records that it received a message with an ID of "abcd" on connection 3, it will strip the search term off the message and replace it with a randomized character string and then send the request to node D. Node D records that it received a search with an ID of "abcd" from connection 1 and then forwards the search to nodes E, F and C. Because Node C has already seen a search request with an ID of "abcd" it drops the request. Node E records that it received a search with an ID of "abcd" from connection 5.

Node F records that it received a search with an ID of "abcd" from connection 6. Node C forwards the search request with an ID of "abcd" on to node D. Because Node D has already seen a message ID of "abcd" from connection I it drops the search request from node C. Nodes C, D, E, and F process the search. Nodes D, E, and F find that they do not have any files that match and thus do not respond. Node C finds that it contains a file named "X" so it sends the message response for "abcd" from connection 2. Node A receives a response from node C on connection 2. Even though the file existed in 3 other locations Node A will only receive one response.

Figure 10:
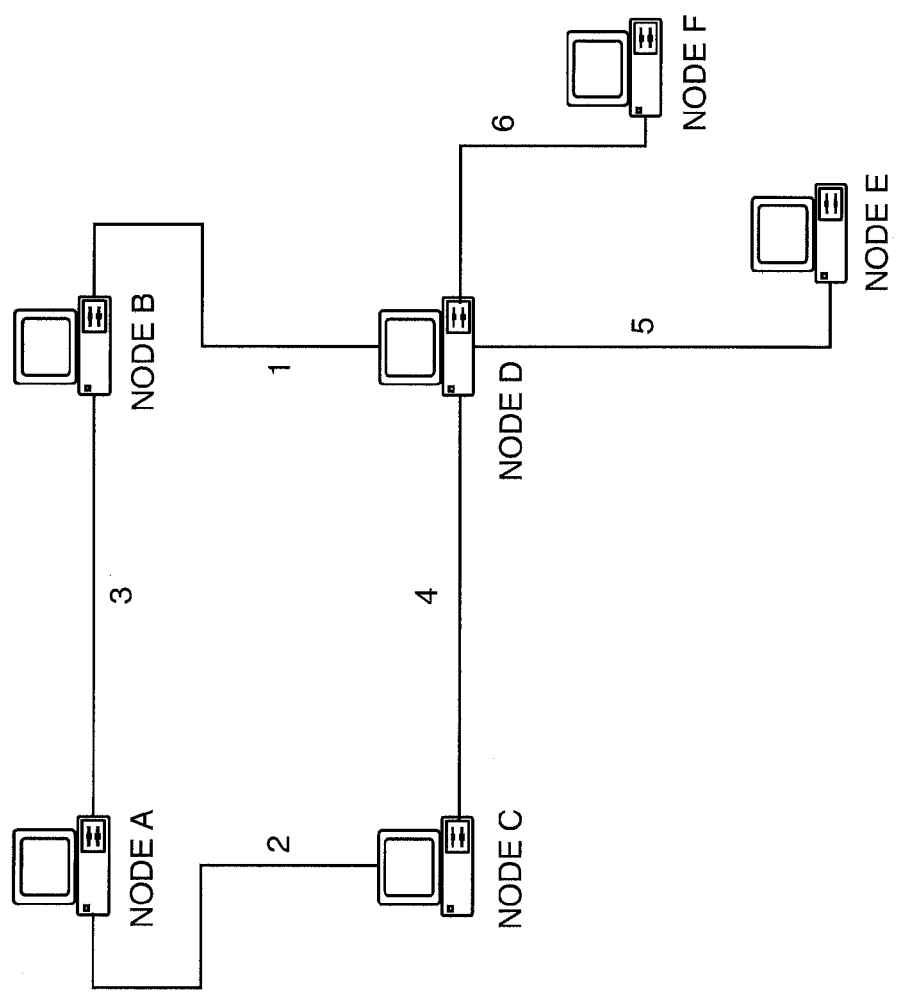
FIG. 10 is a simplified schematic for use in illustration in message saturation discussed below.

In another example of an embodiment of this method, each node on the network in FIG. 10 except node A has the file named "Yellowstone.txt" available. In this network, node B is the pseudonode and is configured to utilize the foregoing low bandwidth saturation method to respond to searches for the file named "Yellowstone.txt."

Assuming Node A issues a search request for the file named "Yellowstone.txt" by sending a request containing the term "Yellowstone.txt" with a message ID of "abcd" to nodes B and nodes C. When Node C receives the search request, it records the message ID. However, when Node B receives the search request it finds that it matches "Yellowstone.txt" which is an object stored and which it has been configured to look for. Node B then replaces the "Yellowstone.txt" search term with "abcdefghijklmnopqrstuvwxyz" and maintains the message ID of "abcd". Node B will then forward this new message to Node D. Node D records this message ID and forwards the message to nodes E, F, and C. Nodes E and F records this message ID. Because Node C has already received a search request with a message ID of "abcd" it drops the search request from node D. Nodes D, E, and F search for files containing "abcdefghijklmnopqrstuvwxyz." Node C, on the other hand, searches for files containing the term "Yellowstone.txt". Nodes D, E, and F will find no files that match and will not respond. Node C will find a file that matches and will respond. The end result is that the file was located in four locations, in this example, but node A only receives one response for the file from one location.

Example 9

This example illustrates a preferred embodiment of the just seen saturation method applied to networks with high bandwidth. In a preferred method, when a pseudonode receives a search request that matches its criteria, it will forward this search request to all other nodes to which it is connected. These nodes will in turn forward the request to all other network nodes they are connected to, and so on. If matches are found on any node, they will respond back through connections that ultimately lead to the pseudonode. Under normal operation of a peer to peer network the pseudonode should forward the search results through it and on to the node that initiated the request. In this method of the present invention, the search is received by the pseudonode and sent on to the other nodes as normal. However, once the response comes back to the pseudonode the pseudonode will drop the results.

This method saturates the network and reduces the overall number of nodes that respond back to the requester.

More specifically and with reference to FIG. 10, if Node A searches for the file "X" by issuing a request for it to its connected nodes (node B and node C), its search request will have a message ID, for example "abcd". Because node B is acting as a pseudonode and is configured to look for searches for file X and because node A sent it a request for file X, node B records that it received a message with an ID of "abcd" on connection 3 and sends the request to node D. Node D records that it received a search with an ID of "abcd" from connection 1 and then forwards the search to nodes E and F. Node E records that it received a search with an ID of "abcd" from connection 5. Node F records that it received a search with an ID of "abcd" from connection 6. Node C records that it received a search with an ID of "abcd" from connection 2 and sends the search on to node D. Because Node D has already seen a message ID of "abcd" from connection 1 it drops the search request from node C. Nodes C, D, E, and F process the search. All nodes find that they have the file and issue search responses for message ID "abcd". Node F looks up message ID "abcd" and finds that it was received from connection 6 so it sends the message response for "abcd" out that connection. Node E looks up message ID "abcd" and finds that it was received from connection 5 so it sends the message response for "abcd" out that connection. Node D receives responses from nodes E and F and also has its own response for message ID "abcd". Node D looks up message ID "abcd" and finds that it was received from connection 1 and forwards its response and the responses of nodes E and F out that connection. Node B receives the response from node D and drops the response. Node B receives the response from node E and drops the response. Node B receives the response from node F and drops the response. Node C looks up message ID "abcd" and finds that it was received from connection 2 so it sends its message response for "abcd" out that connection. Node A receives a response from node C on connection 2. The end result is that the file was located in four locations, in this example, but node A only receives one response for the file from one location.

Example 10

This example illustrates a preferred embodiment of response scrubbing. In a preferred method, when a pseudonode receives a search request that matches its criteria, it will optionally forward this search request to all other nodes to which it is connected. These nodes will in turn forward the request to all other network nodes they are connected to, and so on. If matches are found on any node, they will respond back through connections that ultimately lead to the pseudonode. Under normal operation of a peer to peer network the pseudonode should forward the search results through it and on to the node that initiated the request. In this method of the present invention, the search is received by the pseudonode and sent on to the other nodes as normal. However, once the response comes back to the pseudonode the pseudonode will change the IP address and/or client ID address of the response and then forward the changed response message on to the originator of the search. These can either be totally random addresses or they can be addresses that are configured on the pseudonode. The pseudonode could also take a response and change the file name to that of an advertisement. The pseudonode could also change the IP address and/or client ID address of a response and make it point to a system that would offer up the file, but the file being or containing an advertisement. The pseudonode could also add its own response to the result list. This response could be an advertisement, a message, or a pointer to a file. The end result is that the node that initiated the search will be presented with valid file names and file sizes but the locations will be of nodes that may not exist. This method saturates the network and reduces the overall number of nodes that respond back to the requestor. Moreover, it allows the pseudonode to respond back with file names and file sizes that the requestor would find on any other typical node making them appear valid. File names and file sizes change on peer to peer networks for a variety of reasons. Using this method allows the pseudonode to always respond with the currently accepted file names and file sizes for the files in question.

More specifically and with reference to FIG. 10, if Node A searches for the file "X" by issuing a request for it to its connected nodes (node B and node C), its search request will have a message ID, for example "abcd". Because node B is configured to look for searches for file X and because node A sent it a request for file X, node B records that it received a message with an ID of "abcd" on connection 3 and sends the request to node D. Node D records that it received a search with an ID of "abcd" from connection 1 and then forwards the search to nodes E and F. Node E records that it received a search with an ID of "abcd" from connection 5. Node F records that it received a search with an ID of "abcd" from connection 6. Node C records that it received a search with an ID of "abcd" from connection 2 and sends the search on to node D. Because Node D has already seen a message ID of "abcd" from connection 1 it drops the search request from node C. Nodes C, D, E, and F process the search. All nodes find that they have the file and issue search responses for message ID "abcd". Node F looks up message ID "abcd" and finds that it was received from connection 6 so it sends the message response for "abcd" out that connection. Node E looks up message ID "abcd" and finds that it was received from connection 5 so it sends the message response for "abcd" out that connection. Node D receives responses from nodes E and F and also has its own response for message ID "abcd". Node D looks up message ID "abcd" and finds that it was received from connection 1 and forwards its response and the responses of nodes E and F out that connection. Node B receives the response from node D and replaces the IP address with a random value and replaces the client ID value with "G". Node B receives the response from node E and replaces the IP address with a random value and replaces the client ID value with "H". Node B receives the response from node F and replaces the IP address with a random value and replaces the client ID value with "I". Node B then looks up message ID "abcd" and finds that it was received from connection 3 so it sends the message responses out that connection. Node C looks up message ID "abcd" and finds that it was received from connection 2 so it sends its message response for "abcd" out that connection. Node A receives responses from D, E & F on connection 3 and a response from node C on connection 2. Node A is presented with 4 files named "X" located at the following locations:
Node G
Node H
Node I
Node C Because nodes G, H, and I do not exist the user wastes resources trying to retrieve the file.

Example 11

This example illustrates a method for responding to a request on a peer to peer network. Referring to FIG. 1, Node B is acting as a pseudonode and is configured to respond to any node issuing a search request for a file named "X" with an advertisement.

When Node A issues a search request on the network for a file named "X" Node B will detect this search and compare Node A's search string to its configured list of strings. Because Node A is searching for a file named "X" and Node B is configured to respond to searches for a file named "X", Node B will send back a response to Node A that is an advertisement. The advertisement information could be a file, a message, or a pointer to a file. The advertisement might be a product placement ad, or a music or video file that contains an advertisement. The file could be located on the psuedonode, or on a different system. This system could optionally be dedicated. It should be understood that a file sent in response to the request can include advertising information. If for example the search request was for a file called "madonna.mp3" the downloaded file may contain an audio advertisement. The advertisement itself may be related to the search request; e.g., the audio advertisement may be for a vendor of an authorized copy of the requested mp3 file on a compact disk (CD).

Example 12

This example illustrates a method for responding to a request on a peer to peer network. Referring to FIG. 1, Node B is acting as a pseudonode and is configured to respond to any node issuing a search request.

When Node A issues a search request on the network for a file named "X" Node B will detect this search. Because Node A is searching and Node B is configured to respond to searches, Node B will send back a response to Node A. This response could be a invalid file, a message, or an advertisement. The advertisement could be a file, a message, or a pointer to a file. The advertisement might be a product placement ad, or a music or video file that contains an advertisement. The file could be located on the psuedonode, or on a different system. This system could optionally be dedicated. It should be understood that a file sent in response to the request can include advertising information. If for example the search request was for a file called "madonna.mp3" the downloaded file may contain an audio advertisement. The advertisement itself may be related to the search request; e.g., the audio advertisement may be for a vendor of an authorized copy of the requested mp3 file on a compact disk (CD).

While this invention has been particularly shown and described with references to example embodiments thereof, it will be understood by those skilled in the art that various changes in form and details may be made therein without departing from the scope of the invention encompassed by the appended claims.

What is claimed is:
1. A method executed by a peer to peer network node for advertising the method comprising:
    connecting to a network;
    monitoring said network through the peer to peer network node to detect requests for data from another peer to peer network node; and
    sending a response to the other peer to peer network node from the peer to peer network node indicating that the peer to peer network node has the requested data but responding with different data from the requested data, the different data masked as the requested data and used;
    wherein sending a response further comprises transmitting to the other peer to peer network node the different data instead of data received from additional other peer to peer network nodes in the network, the data received from the additional other peer to peer network nodes resulting from forwarding the request to the additional other peer to peer network node.
2. The method as set forth in claim 1 wherein said peer to peer network node further provides at least one IP address and optionally at least one client ID, and said peer to peer network node further performs the steps of:

stripping a search term from the request including a search string related to the at least one stored search string and replacing the search term with a randomized character string; and forwarding the request to the network.

storing at least one search string;

monitoring said network to detect request including a search string related to the at least one stored search string, each request tagged with a unique message ID;

recording the unique message IDs;

dropping other requests including the same unique message ID as at least one of the recorded unique message IDs;

3. The method as set forth in claim 1 wherein said responding with information is in response to a specific request.

4. The method as set forth in claim 2 wherein at least one of said IP address and client ID is changeable upon the occurrence of a preselected event or events.

* * * * *